(12) United States Patent
Hitotsumatsu

(10) Patent No.: US 7,240,008 B2
(45) Date of Patent: Jul. 3, 2007

(54) SPEECH RECOGNITION SYSTEM, PROGRAM AND NAVIGATION SYSTEM

(75) Inventor: Takafumi Hitotsumatsu, Kariya (JP)

(73) Assignee: Denso Corporation, Kariya (JP)

( * ) Notice: Subject to any disclaimer, the term of this patent is extended or adjusted under 35 U.S.C. 154(b) by 810 days.

(21) Appl. No.: 10/232,309

(22) Filed: Sep. 3, 2002

(65) Prior Publication Data

US 2003/0065516 A1 Apr. 3, 2003

(30) Foreign Application Priority Data

Oct. 3, 2001 (JP) .............................. 2001-307542

(51) Int. Cl.
 G10L 15/00 (2006.01)
 G10L 11/00 (2006.01)
(52) U.S. Cl. ...................... 704/275; 704/255; 704/231
(58) Field of Classification Search ........ 704/251–255, 704/270, 275
 See application file for complete search history.

(56) References Cited

U.S. PATENT DOCUMENTS 5,884,259 A * 3/1999 Bahl et al. .................. 704/252

FOREIGN PATENT DOCUMENTS

| JP | A-61-70663 | 4/1986 |
|---|---|---|
| JP | A-2-123399 | 5/1990 |
| JP | A-3-141398 | 6/1991 |
| JP | A-7-261786 | 10/1995 |
| JP | A-10-97275 | 4/1998 |
| JP | A-10-254481 | 9/1998 |
| JP | A-10-31990 | 12/1998 |
| JP | A-11-45097 | 2/1999 |
| JP | A-11-327593 | 11/1999 |
| JP | A-2000-35797 | 2/2000 |
| JP | 2000-305595 | 11/2000 |
| JP | A-2000-322083 | 11/2000 |
| JP | A-2001-134286 | 5/2001 |
| JP | A-2001-154691 | 6/2001 |

OTHER PUBLICATIONS

Lee et al., "Large Vocabulary continuous Speech Recognition Based on Multi-Pass Search Using Word Trellis Index," *Denshi-jyohou-tuushin-gakkai(IEICE)*, D-II, vol. J82-D-II, No. 1, 1999, pp. 1-9.

(Continued)

*Primary Examiner*—V. Paul Harper
(74) *Attorney, Agent, or Firm*—Posz Law Group, PLC

(57) ABSTRACT

Voice of a user is inputted to a speech recognition section until a start of a no-voice domain from depression of a talk-switch. LPC cepstrum coefficients are calculated from the voice in an LPC analysis section and a cepstrum calculation section, and then temporarily stored in a parameter backward output section. A series of the LPC cepstrum coefficients is re-arranged to the series in which the time axis is inverted and then outputted to a collating section. The collating section calculates a degree of similarity between the LPC cepstrum coefficients and a recognition dictionary of a backward tree-structure stored in a standard pattern section through a backward collating.

7 Claims, 6 Drawing Sheets

OTHER PUBLICATIONS

Kitaoka et al., "Continuous Speech Recognition based on right-to-left A* Search With Case Structure," *Technical Report of IEICE*, SP93-19 (Jun. 1993), pp. 41-48.

Office Action and its translation from Japanese Patent Office dated Sep. 20, 2005.

Notice for Reason for Rejection issued from Japanese Patent Office issued on Jan. 10, 2006 for the corresponding Japanese patent application No. JP-2001-307542 (a copy and English translation thereof).

* cited by examiner

| [STATE] | [PRONUNCIATION SYMBOL] |
|---|---|
| ALABAMA | æləbæmə |
| OKLAHOMA | oukləhoumə |
| FLORIDA | flɔrədə |
| GEORGIA | dʒɔədʒə |

COLLATING →

SPEECH RECOGNITION SYSTEM, PROGRAM AND NAVIGATION SYSTEM

CROSS REFERENCE TO RELATED APPLICATION

This application is based on and incorporates herein by reference Japanese Patent Application No. 2001-307542 filed on Oct. 3, 2001.

FIELD OF THE INVENTION

The present invention relates to a speech recognition technique which can be applied to input by voice a travel destination, for example, in a navigation system.

BACKGROUND OF THE INVENTION

A speech recognition system provides a result of recognition based on the higher degree of matching by comparing the input voice with a plurality of pattern candidates as the comparison objects stored previously. It is used for a user to input, by voice, a name of place to be set as a destination, for example, in a navigation system. Particularly, when a driver utilizes a mobile navigation system while driving, the voice input method is very safe and effective since this method does not require the driver's manipulation such as controlling buttons or watching a display.

In order to satisfy such functions, it is essential to easily designate a place in a sufficient detail level. Practically, it is required to be able to input the place up to the level of Town or Street (smallest unit of area) under the City name, exceeding the level of Prefecture and City. Moreover, when users desire, for example, to set the destination as "Showa-Town, Kariya-City, Aichi-Prefecture", it is very troublesome for users when they are requested to pronounce the destination in separation for every levels of Town, City and Prefecture such as "Showa-Town", "Kariya-City" and "Aichi-Prefecture". Therefore, it is preferable for users that they can input the series of words of the address continuously (continuous input).

In the case of an address of a place in Japan, the address is first branched, in the expression of the Japanese style, depending on the Metropolis of Tokyo, Hokkaido, Osaka-Fu, Kyoto-Fu, and 43 Prefectures which are the highest hierarchical level and the branching factors are increasing in the sequence of the voice input such as City, Town, and a house number. Therefore, it is effective to execute the speech recognition by using a recognition dictionary of a tree-structure for such recognition words. FIG. 6 shows an example of the tree-structure dictionary for the recognition of addresses in Japan. In this case, an address is first branched, as explained above, depending on the highest hierarchical level (for example, Aichi-Prefecture, Gifu-Prefecture, . . . ), then branched depending on City (Town, Village) for each of the highest hierarchical level, and then branched depending on name of Town for each City, . . . Namely, when expression of an address in the Japanese style is considered in the sequence of the voice input, as the address level becomes lower, the branching points increase more.

However, in various countries other than Japan in the world, for example, in the USA and European countries, an address often starts from a house number as the lowest hierarchical level and is then expressed in the reverse sequence of the expression in the Japanese style such as Name of Street→Name of City→Name of State. Therefore, if a recognition dictionary of tree-structure is generated for such recognition of the addresses, the recognition dictionary is formed in the so-called "Backward Tree-structure", in which the number of branching points decreases and are to be combined as the address level becomes higher. As a result, an address is branched to the next level at many branching points from the first hierarchical level (lowest hierarchical level) (for example, in the USA, such branching points increases up to about several millions from several hundreds of thousand). Therefore, it is probable that a load of the matching process increases and thereby the recognition time becomes longer.

Moreover, as a method of reducing a load of the process, it is known to introduce a "cut of branch" process to narrow down candidates in the recognition in the tree-structure dictionary. However, when such "cut of branch" process is adopted to the backward tree-structure dictionary, the possibility for cutting the branch including the word of the correct answer actually becomes high. Therefore, cut of branch cannot be effective, resulting in poor recognition performance. Accordingly, since there is no particular merit for generation of the recognition dictionary of the tree-structure, it has been difficult to apply the continuous speech recognition technique to such a voice input having a backward tree-structure.

This problem arises, in addition to the case of address, in any recognition dictionary of backward tree-structure.

SUMMARY OF THE INVENTION

The present invention solves the above problems and improves the recognition performance on the voice input having the backward tree-structure in which a plurality of words are coupled toward the high hierarchical level from the low hierarchical level depending on the input sequence, for example, such as an address expressed in the USA and European countries.

This recognition means of the present invention executes the backward recognition process using the recognition dictionary of the backward tree-structure to inversely recognize a series of voice inputs to the voice whose input timing is old from the voice whose input timing is new. Thereby, the backward tree-structure dictionary can be effectively used as the ordinary recognition dictionary of the forward tree-structure starting from the higher hierarchical level. As a result, it is possible to expect improvement in the recognition performance in the series of voice input having backward tree-structure.

BRIEF DESCRIPTION OF THE DRAWINGS

The above and other objects, features and advantages of the present invention, will become more apparent from the following detailed description made with reference to the accompanying drawings. In the drawings.

DETAILED DESCRIPTION OF THE PREFERRED EMBODIMENTS

Figure 1A:
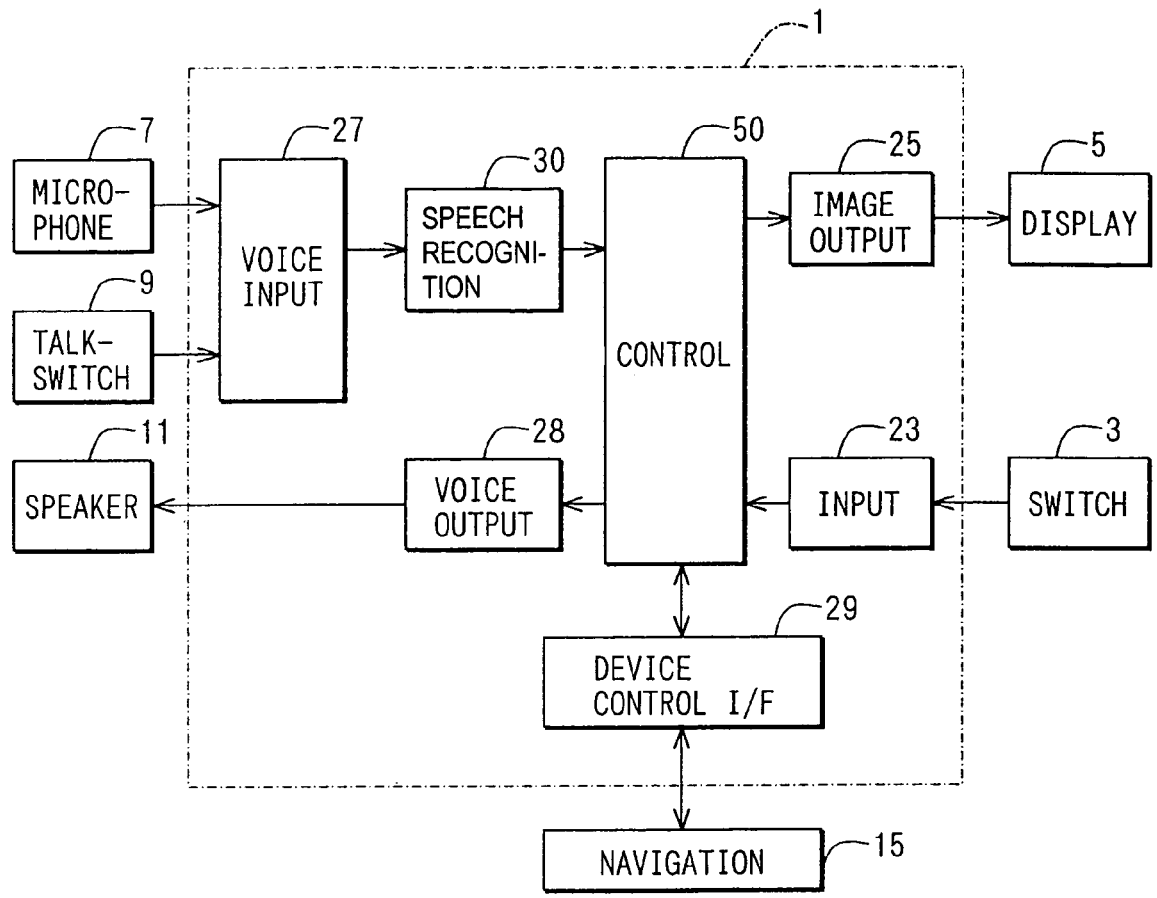
FIG. 1A is a block diagram of a system including a speech recognition system of an embodiment of the present invention.

Referring to FIG. 1A, a speech recognition system 1 of this embodiment is loaded in a vehicle (automobile) to control a navigation apparatus 15 which is also loaded in the vehicle through a voice communication with a passenger (mainly a driver) of the vehicle.

The speech recognition system is further connected to a switch device 3 for inputting various commands and data with user's external manipulation thereof, a display 5 for displaying images, a microphone 7 for inputting voices, a talk-switch 9 to be manipulated for inputting voices, and a speaker 11 for outputting voices.

The navigation apparatus 15 is for detecting the present position (location) of the vehicle or executing the route guidance, and is provided with a known GPS device for detecting the present location of vehicle, a CD-ROM storing data for route guidance such as map data, place name data and facilities data, a CD-ROM drive for reading the data from the CD-ROM and manipulation keys for inputting the user's commands. Here, it is also possible to use a DVD in place of the CD-ROM. When a user inputs a command to instruct the route guidance to a destination from a starting position, for example, via the manipulation keys, the navigation apparatus 15 executes the route guidance by displaying, on the display 5, the road map including the optimum route to the destination from the present location of the vehicle. Moreover, the display 5 displays not only the road map for route guidance but also various images such as menus for searching information pieces.

The speech recognition system 1 includes a control section 50 which is mainly structured with a microcomputer consisting of a CPU, ROM and RAM, an input section 23 for inputting commands and data from the switch device 3 to the control section 50, an image output section 25 for outputting an image data outputted from the control section 50 to the display unit 5 through conversion to a video signal and then displaying the images on the display area, a voice input section 27 for converting a voice signal inputted from the microphone 7 into a digital data, a speech recognition section 30 for recognizing and obtaining a key-word (utterance key-word) as a language uttered by a user from a voice signal inputted via the voice input section 27, a voice output section 28 for outputting a text data outputted from the control section 50 to the speaker 11 through conversion to an analog voice signal to sound the speaker 11 and a device control interface (device control I/F) 29 for connecting the navigation apparatus 15 and the control section 50 for the data communication.

The voice input section 27 extracts, to analyze a characteristic amount of the input voice, a frame signal in the domain of about several tens of ms in a constant interval and determines whether the input signal is a voice domain including the voice or a noise domain not including the voice. The signal inputted from the microphone 7 allows coexistence of the voice as the recognition object and noise and therefore determination for voice domain and noise domain is executed. As a method of determining such voice and noise domains, various methods have been proposed. For example, a short-term power of an input signal is extracted in every constant period and the voice domain or noise domain is determined depending on whether the short-term power which is higher than the predetermined threshold value continued for the period longer than the constant period or not. When the voice domain is determined, the input signal is outputted to the speech recognition section 30.

Figure 1B:
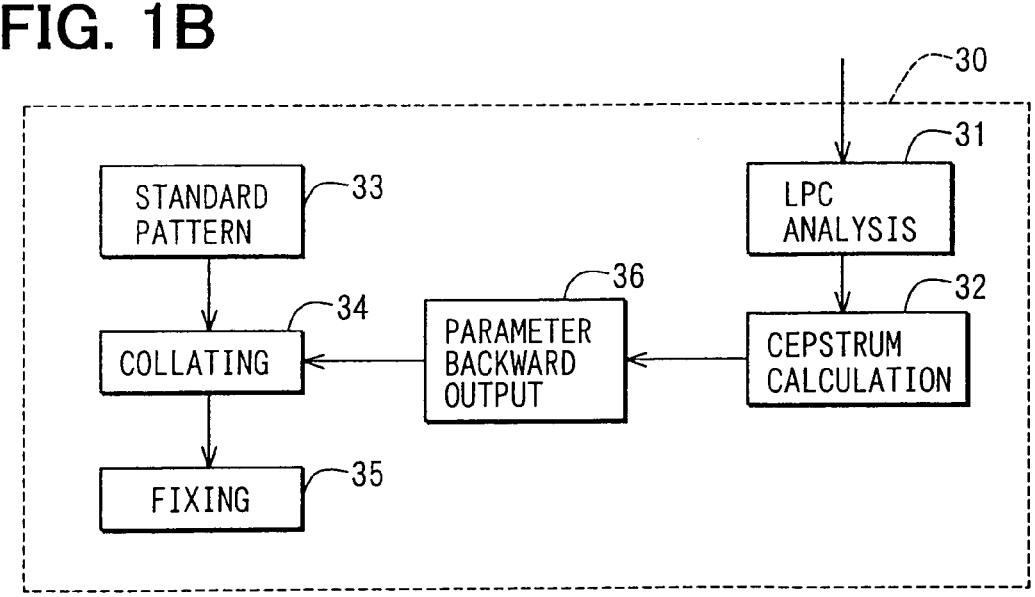
FIG. 1B is a block diagram of a speech recognition section.

Here, the structure of the speech recognition section 30 will be explained in more detail with reference to FIG. 1B.

The speech recognition section 30 comprises an LPC (Linear Predictive Coding) analysis section 31, a cepstrum calculation section 32, a standard pattern storing section 33, a collating section 34, a fixing section 35 and a characteristic parameter backward output section 36.

The LPC analysis section 31 executes the linear predictive analysis using an output from a noise canceling device. The linear predictive analysis is an ordinary method in the field of voice signal process. This method is explained in detail in the reference "Digital Voice Process" by Furui (published from Tokai Univ. Publication Society). In this embodiment, the self-correlation method is used for the linear predictive analysis and the LPC coefficient of m(th)-order is calculated using the self-correlation coefficient C(r).

The cepstrum calculation section 32 calculates the LPC cepstrum coefficient as the characteristic parameter on the spectrum of each frame on the basis of the LPC coefficient calculated by the LPC analysis section 31.

A series of the LPC cepstrum obtained by the cepstrum calculation section 32 is outputted to the characteristic parameter backward output section 36 and is then stored temporarily until the predetermined instruction is issued. When the predetermined instruction is issued, the characteristic parameter backward output section 36 re-arranges such LPC coefficients in the series where the time axis is inverted and then outputs this inverted series of the LPC coefficients to the collating section 34.

On the other hand, the standard patterns (characteristic parameter series) of the recognition object words which have been calculated previously are stored in the standard pattern storing section 33 and the collating section 34 calculates a degree of similarity between the standard pattern stored in the standard pattern storing section 33 and the LPC cepstrum coefficient, calculated by the cepstrum calculation section 32, whose time axis is inverted by the characteristic parameter backward output section 36. These sections divide the time series data in to several domains with the known DP matching method, HMM (hidden Markov Model) or neural net or the like and obtain the correspondence between each domain and the word in which such domain is stored as the dictionary data.

Figure 2:
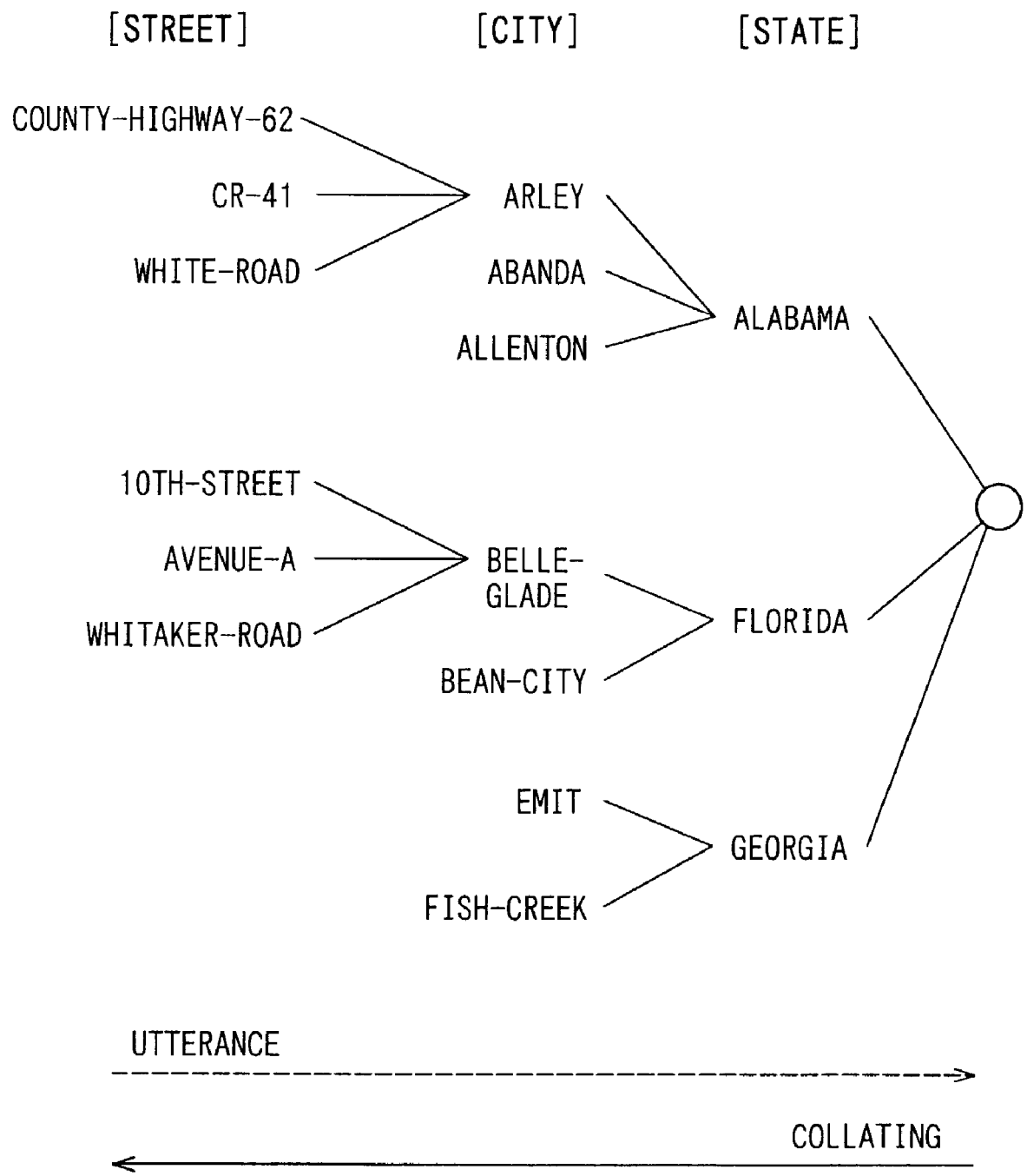
FIG. 2 is an explanatory diagram of an example of geographical dictionary in the USA introducing a backward tree-structure expression method.

The standard pattern data stored in the standard pattern storing section 33 of this embodiment stores not only the data of the words which is a comparison object pattern candidate but also the data indicating its hierarchical structure when the word of the comparison object pattern is formed by coupling hierarchically a plurality of words. In FIG. 2, for example, a geographical dictionary in the USA is illustrated, in which a place is indicated by the tree-structure expression. This geographical dictionary is structured in the tree-structure of a plurality of levels of name of street, name of city and name of state or levels of name of city and name of state. Here, a more detail dictionary can be obtained by adding house numbers and ZIP code as the structural elements. On the contrary, a simplified dictionary can also be structured only with the name of city and name of state. In FIG. 2, the words forming each name of place are displayed sequentially from the left side in the sequence of utterance. These words are coupled by solid lines to form a tree-structure. When this tree-structure is collated with the input voices, collating is executed from the right side, namely from the name of state which is uttered later on the time axis.

Figures 3A, 3B:
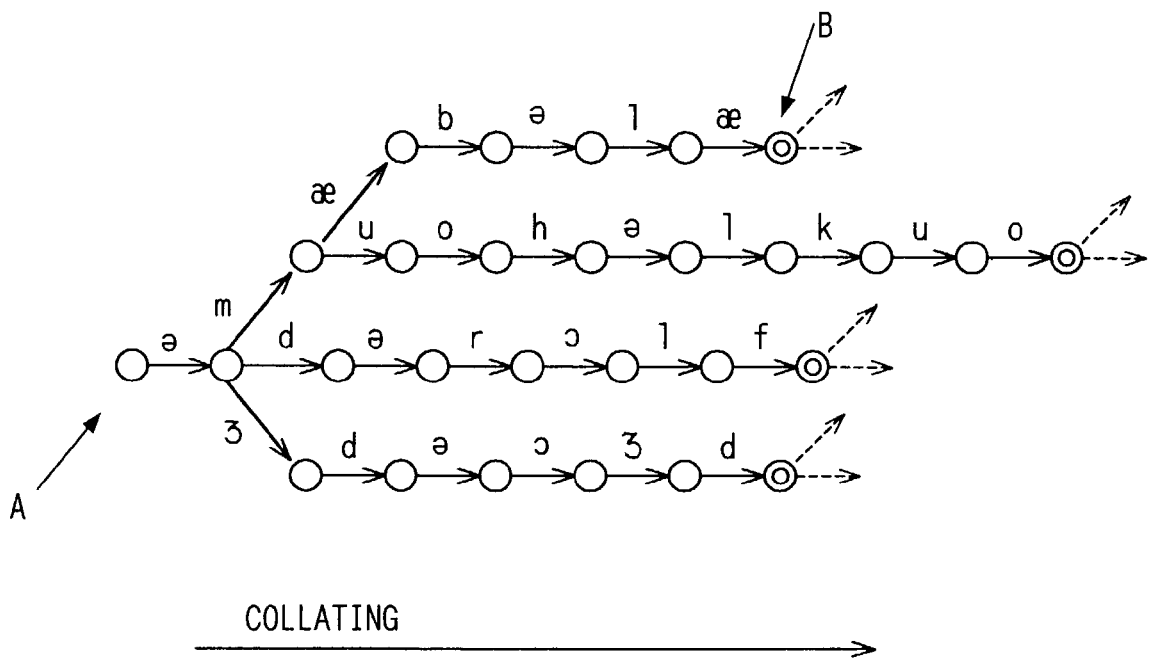
FIG. 3A is an explanatory diagram of the geographical dictionary of FIG. 2 generated by using a standard pattern in unit of phoneme.
FIG. 3B is a practical example of FIG. 3A.

Since the collating is executed from the name of state which is uttered later on the time axis, the standard pattern can be generated in unit of phoneme as shown in FIGS. 3A and 3B. In FIG. 3A, only a part of the names of states is illustrated and such names of states are divided in unit of phoneme using the pronunciation symbols. These pronunciation symbols are collated from the rear side in FIG. 3B. As shown in FIG. 3B, the phoneme data forming a word is assigned to each side (indicated by an arrow mark (→) in FIG. 3B) of the tree-structure. In FIG. 3B, a single-circle (○) indicates a branching point, while a double-circle (◎) indicates a reception branching point, namely the branching point for a word. The branching point indicated by the arrow mark A in FIG. 3B is a "root" and a word is completed by following the syllables assigned to each side depending on the preorder traversal scanning from such root. Here, the "preorder traversal scanning" means the scanning method in which the scanning is executed first to the root and is then executed sequentially to a partial tree in which a child is set as the root (this scanning is also called the preorder traversal scanning). Here, "parent" means a preceding branching point, "child" means the next branching point and "brother" means the branching points of the same parent.

Namely, in the practical example shown in FIG. 3B, when the collating is executed sequentially up to the reception branching point indicated by the arrow mark B from the branching point (indicated by the arrow mark A) as the "root", the state of Alabama is inversely expressed in unit of the phoneme. Therefore, Alabama is one recognition object word. Moreover, each name of city in the state of Alabama is inversely expressed thereafter in unit of phoneme via the reception branching point indicated by the arrow mark B. Here, since the last phoneme is used in common in the four names of states shown in FIG. 3A, namely in Alabama, Oklahoma, Florida and Georgia, the branching is conducted from the same reception branching point. In the same manner, the branching is executed from the same reception branching point for the names of city in the same state in which the same phoneme is used in common and the branching is also executed from the same reception branching point for the names of street in the same city in which the same phoneme is used in common.

Since it is effective when the collating for the hierarchical recognition object word is started from the higher hierarchical level, a dictionary in which the collating can be conducted sequentially to the name of street, name of city from the name of state as the higher hierarchical level with the process in unit of the phoneme as explained above has been generated, for example, for the address in the USA for which the voices are inputted toward the higher hierarchical level from the lower hierarchical level.

After the degree of similarity is calculated in the collating section 34 using the standard pattern of such data, the fixing section 35 outputs a word in the highest degree of similarity calculated in the collating section 34 among the recognition object words to the control section 50 as a result of recognition.

The control section 50 determines the final recognition result and executes the predetermined post-process. As the predetermined post-process, it is considered to send the data to the navigation apparatus 15 via the device control I/F 29 when the predetermined instruction is issued to instruct the execution of the predetermined process. For example, a process to instruct execution of the preset process is executed by notifying a destination required for the navigation process. As a result of such processes, the destination for the navigation system can be instructed with the voice input process by utilizing the speech recognition system 30 without use of a manipulation switch group 8 or a remote control device 15a. Moreover, the control section 50 also executes the process so that the recognition result outputted from the speech recognition system 30 is sent to the voice output section 28 as the text data and is then sounded from the speaker 11.

As a recognition result to be sent to the control section 50 from the speech recognition section 30, all more significant comparison object patterns as the final recognition result may be sent or only the most significant object pattern may be sent. However, in the following explanation, it is considered as the precondition for easier understanding unless otherwise noted particularly that only the most significant object pattern is transmitted.

Moreover, in this embodiment, when a user depresses the talk-switch 9, thereafter a user is ready to execute the voice input. Since it can also be assumed that no voice input may be done even after the talk-switch 9 is depressed, if no-voice domain lasts exceeding the predetermined period after voice input has becomes possible by depression of the talk-switch 9, situation changes resulting in the condition which disables voice input. Therefore, the voice input section 27 detects that the talk-switch 9 is depressed by monitoring the timing of the depression.

Figure 4:
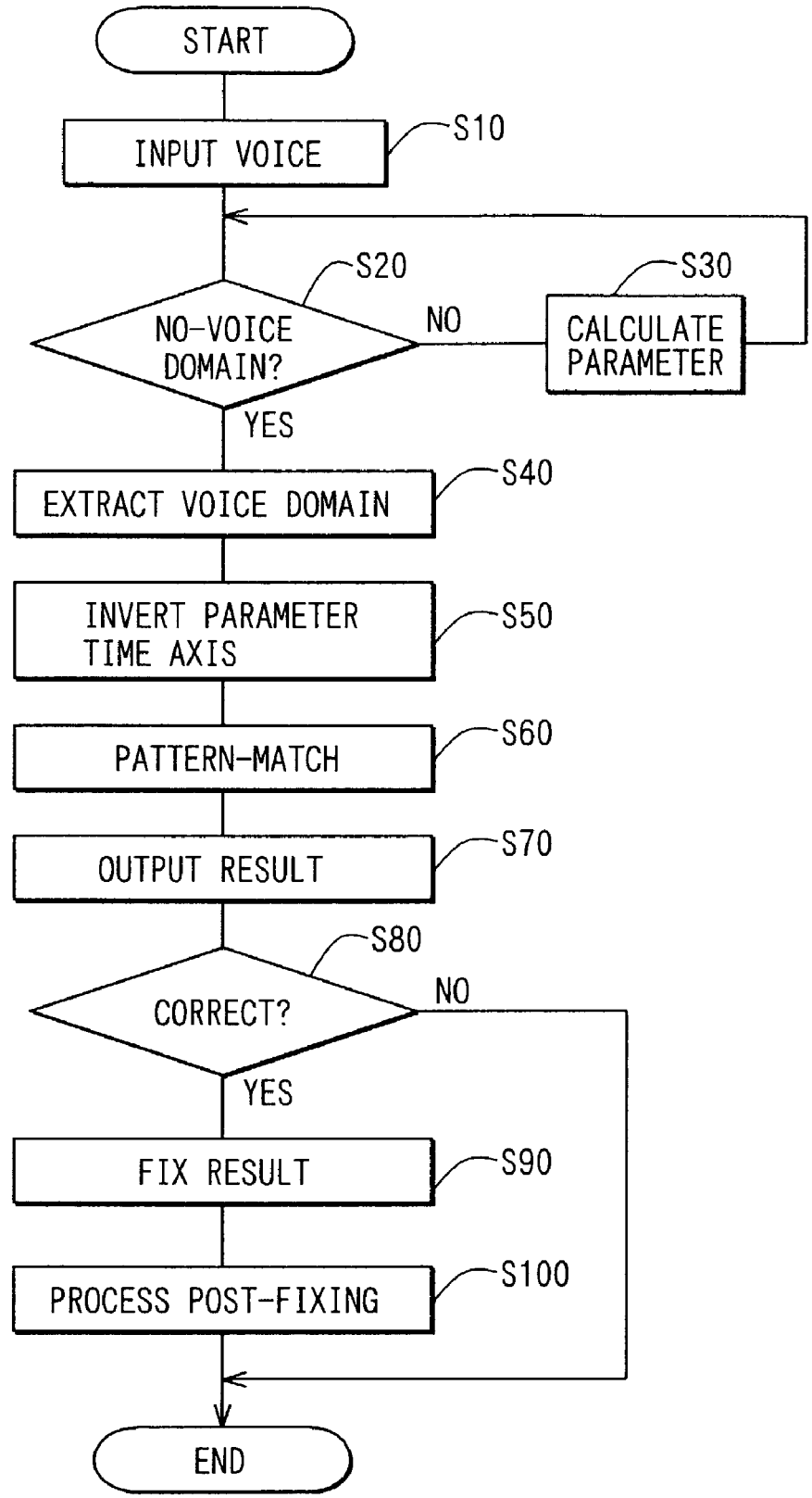
FIG. 4 is a flowchart showing the process in relation to the speech recognition in the speech recognition system.

The speech recognition system 1, particularly the section 30 is programmed to operate as shown in FIG. 4. It is assumed that the destination is set by the voice input method for searching the route with the navigation apparatus 15.

The process of FIG. 4 starts when the talk-switch 9 is turned on (depressed). In the first step S10, a user inputs voices via the microphone 7 to the voice input section 27. It is determined whether the no-voice domain of the predetermined time of t seconds is detected or not (S20). When the no-voice domain is not detected (S20: NO), the characteristic parameter of input voice is calculated in the speech recognition section 30 and it is stored (S30). The LPC analysis section 31 calculates the LPC coefficients, the cepstrum calculation section 32 calculates the LPC cepstrum coefficients as the characteristic parameters and this parameters are temporarily stored in the characteristic parameter backward output section 36.

When the no-voice domain of the predetermined time of t seconds is detected (S20: YES), the period until the no-voice domain is generated from the turning on of the talk-switch 9 is extracted as the voice-domain (S40) and the time axis of characteristic parameter is inverted. Namely, the characteristic parameter backward output section 36 outputs the series of the LPC cepstrum coefficients stored temporarily in the collating section 34 after the re-arrangement of coefficients to the series in which the time axis is inverted (S50).

The collating section 34 executes the pattern matching between the standard pattern stored in the standard pattern storing section 33 and the LPC cepstrum coefficient outputted from the characteristic parameter backward output section 36 in order to calculate a degree of similarity (S60).

The more significant comparison object pattern determined by the collating result is outputted to the control section 50 as the recognition result and the control section 50 talks back and displays such a recognition result (S70). With this talk-back, the control section 50 controls the voice output section 28 to output the recognized result as the voice from the speaker 11 and also controls the image output section 25 to instruct the display section 5 to display the characters indicating the result of recognition.

Thereby, whether the recognition is correct or not is determined based on the instruction from a user (S80). Determination is executed based on the user's manipulations for the switch device 3. Here, it is also possible that the determination is executed based on the voice input from the microphone. For example, when the voice input such as "YES" indicating the affirmative content is executed, the recognition can be fixed as correct one but if the voice input such as "NO" indicating the negative content is executed, the recognition can be determined as incorrect one.

When the incorrect recognition is fixed (S80: NO), the present process is completed in this timing. When a user executes again the voice input, a user is requested to depress the talk-switch 9 again. Therefore, this process is executed again from the beginning.

Meanwhile, when the affirmative determination is executed, namely the correct recognition is fixed in the step S80, the control section 50 fixes the recognition result (S90). When the recognition result is fixed, the predetermined post-fixing process is executed (S100). In this case, the post-fixing process includes, for example, a process in which the data of the "menu image", if it is the result of recognition, is outputted to the navigation apparatus 15 via the device control I/F 29. After the process in the step S100, this process is completed.

As explained above, according to the speech recognition system 1 of this embodiment, the address expressed in the USA style which is inputted by voice is recognized using the recognition dictionary of backward tree-structure shown in FIG. 2. However, when the address is compared in the input sequence, high recognition performance can not be expected because the dictionary is formed in the tree-structure starting from the low hierarchical level. Therefore, in this embodiment, the characteristic parameters of a series of input voices as the recognition object are converted inversely on the time axis with the characteristic parameter backward output section 36 of the speech recognition section 30 in order to effectively utilize the recognition dictionary of the backward tree-structure starting from the low hierarchical level. The collating of address is executed in the backward direction as shown in FIG. 3 with the recognition dictionary of backward tree-structure of FIG. 2. Namely, the process can be executed by considering the recognition dictionary as the ordinary recognition dictionary of the forward tree-structure starting from the high hierarchical level. As a result, the intrinsic merit of the tree-structure dictionary may be used effectively resulting in expectation for improvement in the recognition performance.

In this embodiment, as shown in the flowchart of FIG. 4, the input voice in the voice domain is temporarily stored through conversion to the LPC cepstrum coefficients as the sequential parameters. After the voice domain is completed, such LPC cepstrum coefficients are inversely converted on the time axis and is then outputted and collated. Therefore, the next operation cannot be started until a series of the voice input is completed.

The above embodiment may be modified as follows.

Figure 5A:
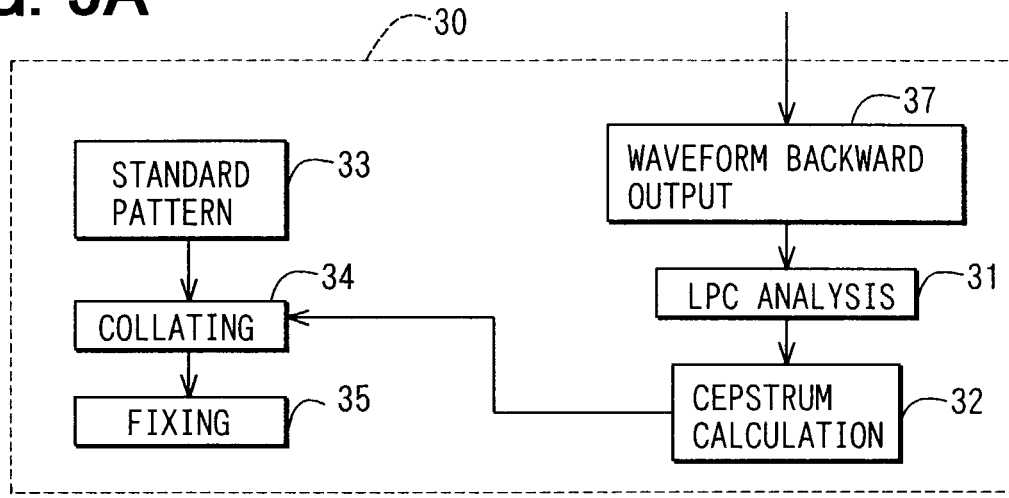
FIG. 5A is an explanatory diagram of a structure of the other embodiment of the present invention.

(1) The above inverse conversion on the time axis may be executed in the stage of the voice waveform information. A structure of the speech recognition section 30 in such a case is shown in FIG. 5A.

In this modification a voice waveform backward output section 37 is provided in the preceding stage of the LPC analysis section 31. This voice waveform backward output section 37 temporarily stores the voice waveform inputted from the voice input section 27 until the predetermined instruction is issued. When the predetermined instruction is generated, such voice waveform is outputted to the LPC analysis section 31 as the voice waveform wherein the time axis is inverted.

Figure 5B:
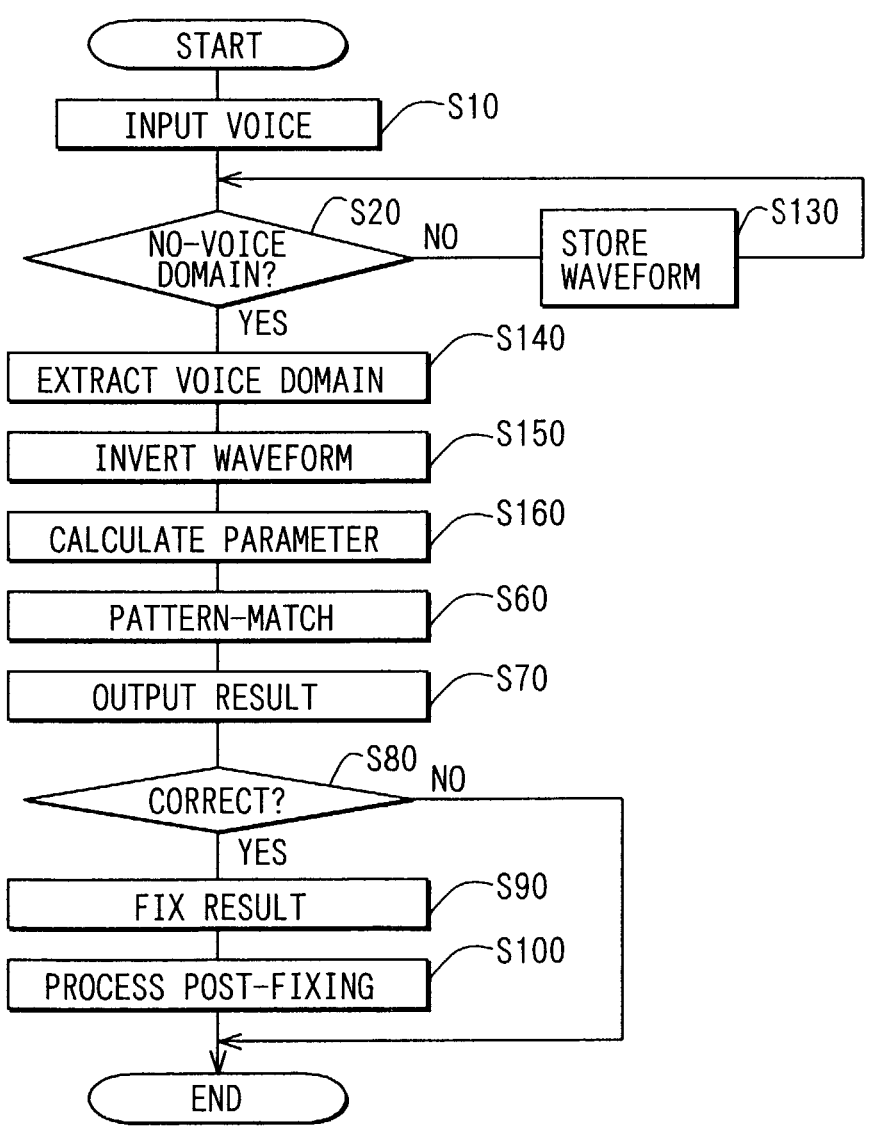
FIG. 5B is a flowchart of the process of the other embodiment of the present invention.
Figure 6:
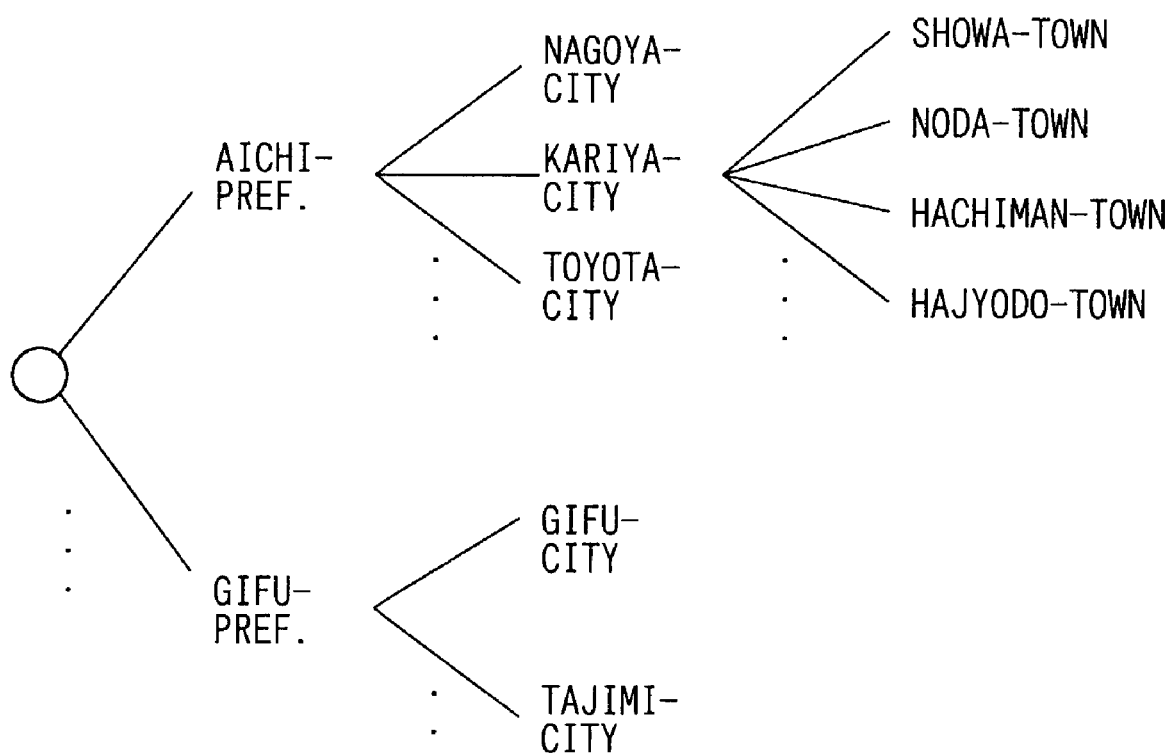
FIG. 6 is an explanatory diagram of a recognition dictionary example of the forward tree-structure.

Operations of this modification will be explained with reference to the flowchart of FIG. 5B. The flowchart of FIG. 5B is attained by partially changing the flowchart of FIG. 4 and the same portions are designated with the same step numbers. In more practical, the steps S10, S20, S60 to S100 in FIG. 4 are identical to that of another embodiment and the steps S30 to S50 are replaced with the steps S130 to S160 of FIG. 5B.

In other words, while the no-voice domain is not detected (S20: NO), the voice waveform backward output section 37 of the speech recognition section 30 temporarily stores the voice waveform inputted from the voice input section 27. When the no-voice domain of the predetermined time of t seconds is detected (S20: YES), the period until the no-voice domain is generated from the turning on of talk-switch 9 is extracted as the voice domain (S140), the voice waveform of this domain is regenerated by inverting the time axis and is then outputted to the LPC analysis section 31 (S150). Here, the LPC analysis section 31 calculates the LPC coefficients, the cepstrum calculation section 32 calculates the LPC cepstrum coefficients as the characteristic parameters and this calculation result is outputted to the collating section 34 (S160). Thereafter, as in the case of the foregoing embodiment, pattern matching is executed between the standard pattern stored in the standard pattern storing section 33 and the LPC cepstrum coefficients calculated by the cepstrum calculation section 32 to calculate a degree of similarity (S60). The subsequent operations are same as those of FIG. 4 and therefore the same explanation is not repeated here.

(2) As a modification for attaining adequate speech recognition, it is possible to obtain, with the cepstrum calculation section 32, a delta cepstrum which means a dynamic characteristic amount (amount of change for the pre-cepstrum and post-cepstrum=indicating a gradient). If this delta cepstrum is inverted directly with the characteristic parameter backward output section 36, this data is no longer the information which should be provided as the delta cepstrum. Therefore, it is only required, to obtain the correct delta cepstrum, that the delta cepstrum is obtained from the inversely outputted cepstrum. Therefore, in the structure utilizing such delta cepstrum, it is only required that the process block for calculating the delta cepstrum is added in the subsequent stage of the characteristic parameter backward output section 36.

As explained in the modification (1), in the structure that the input voice waveform itself is once stored and it is then outputted in the inverse direction, the delta cepstrum has the information which should be provided intrinsically and therefore it is only required that the calculation is executed as usual by the cepstrum calculation section 32.

(3) In place of the LPC cepstrum coefficients, it is possible, for example, to use a cepstrum adjusted with Mel scale or spectrum.

(4) Since the similar recognition dictionary of the structure other than the backward tree-structure can be generated for the address, for example, in the various European countries, this recognition dictionary can also be used in these countries. For example, in the Great Britain, the address is uttered in the sequence of house number→Town→City as in the case of the USA and is basically uttered in the sequence of house number→Town→Mail No.→State in the case of France. Moreover, in the case of Germany, the address is uttered in the sequence of street→house number→Mail number→State.

(5) In view of effective utilization of the recognition dictionary of the backward tree-structure for speech recognition of the addresses in the USA and European countries, it is preferable to introduce the method in which a series input voice as the recognition object is inversely converted on the time axis in the stage of the voice waveform or characteristic parameter. Any additional dictionary is not required in the address recognition system for which the address is uttered sequentially from the low hierarchical level. When it is required to recognize the recognition object words which do not have the characteristic as explained above, the recognition dictionary of the structure other than the backward tree-structure is also provided. Therefore, selection of recognition dictionary is necessary depending on the situation. In this case, it is detected from the predetermined manipulation that the recognition dictionary of the backward tree-structure should be used. Therefore, it is only required that the backward recognition process using the recognition dictionary of the backward tree-structure is executed only in above case. Even when the use in the USA and various European countries is considered, the words other than the addresses explained above must be recognized in the ordinary sequence. Therefore it is not preferable that the input voices are uniformly inverted on the time axis.

Accordingly, in this case, it is also assumed that the speech recognition of address, for example, is detected from manipulations of switches by a user and the backward recognition process is executed only in the case of speech recognition of address by using the recognition dictionary of backward tree-structure for address recognition. For example, the address recognition mode may be set with the manipulation of switch device 3 or the address recognition mode may be set with the speech recognition. For example, when a user has uttered the words "address input", the address recognition mode is set and the process indicated by the flowchart of FIG. 4 is executed.

(6) It is also possible to determine the period in which the talk-switch 9, for example, continues to be depressed as the voice input period. This determination is based, as the preconditions, on the structure that the voice input is allowed only while a user continues to depress the talk-switch 9 as the voice input method.

(7) The present invention may also be applied to the recognition dictionary of the "backward tree-structure" wherein the tree-structure is introduced into the recognition dictionary in which a plurality of words are combined in hierarchical level in the same manner and the voice inputs are combined in the latter sequence.

(8) It is also possible to consider the address recognition from the following point of view. Namely, in an example of the USA, when a person is living at present in the state of Alabama and goes to the other place in the same state, this person usually does not utter intentionally up to the last word of "Alabama". In this case, it is preferable that the voice input where the name of state is omitted can be adequately recognized. Therefore, the name of state is collated from the name of city by assuming that the present position information is inputted, for example, from the navigation apparatus 15 and the voice input of the address where the name of state of such present position is omitted is executed. In the case of FIG. 3B, when a person stays at present in the state of Alabama, it is only required when the speech recognition is executed considering the standard pattern starting from the branching point B as the matching object.

Moreover, flexibility in use can be further improved through alleviation of load of a user that the voice input must be executed from the higher hierarchical level even when it is natural when the higher hierarchical level is omitted by covering the natural behavior in the custom of daily conversation that the name of place in the higher hierarchical level is not arbitrarily identified for the area within the predetermined area where a person is staying and the identification is executed from the area of the lower hierarchical level.

(9) In the case of the recognition dictionary of the forward tree-structure, in order to reduce the load of process, it is known that the so-called "cut of branch" is executed for further narrowing down the candidates in the recognition. When the "cut of branch" is executed using directly the recognition dictionary of the backward tree-structure explained in the above embodiments, the possibility for "cut of branch" including the words of the correct answer actually becomes high. However, in above modifications, it is not disadvantageous even when the "cut of branch" is employed because the process can be executed by considering the recognition dictionary of the backward tree-structure as the ordinary recognition dictionary of the forward tree-structure starting from the high hierarchical level. Therefore, in above embodiments, narrowing down the candidates may be effectively executed through the so-called "cut of branch" process and in this case, it is possible to obtain the merit identical to improvement in the recognition rate.

(10) A program for controlling a computer as a recognizing means can be stored, for example, in a storage medium such as flexible disc, magnetic optical disc, CD-ROM, hard disc, ROM and RAM which can be read with the computer and can also be used by loading and driving through the network.

What is claimed is:

1. A speech recognition system for a navigation apparatus, the speech recognition system comprising:

a voice input means for inputting a series of phonemes formed by hierarchically coupling a plurality of words to define an address arranged from a low hierarchical level toward a high hierarchical level;

a dictionary means for storing a plurality of comparison object pattern candidates; and a recognizing means for outputting a result corresponding to a high degree of matching based on comparison of the series of phonemes inputted via the voice input means with the plurality of comparison object pattern candidates, wherein at least a part of the plurality of the comparison object pattern candidates stored in the dictionary means is formed by hierarchically coupling a plurality of words, wherein the dictionary means is a recognition dictionary of backward tree-structure in which a number of branching points is sequentially reduced depending on a voice input sequence, and wherein the recognizing means utilizes the recognition dictionary of backward tree-structure to execute a backward recognition process in which the series of phonemes inputted via the voice input means is sequentially recognized in a second order that is reversed in comparison with a first order in which the phonemes were spoken.

2. A speech recognition system according to claim 1,
wherein the recognizing means converts a waveform information piece of each of the phonemes to a characteristic parameter, wherein a whole of a series of waveforms corresponding to the phonemes arranged in the first order in which the phonemes were spoken is inversely convened to a series of character parameters, which is arranged in the second order that is reversed in comparison with the first order, and wherein the series of characteristic parameters is used in the backward recognition process.

3. A speech recognition system according to claim 1, further comprising:

an operation detecting means provided to detect a predetermined operation of a user indicating that a present utterance signals a situation to use the recognition dictionary of backward tree-structure, wherein the dictionary means includes a recognition dictionary of tree-structure other than a backward tree-structure, and wherein the recognizing means executes, when the predetermined operation is detected with the operation detecting means, only the backward recognition process using the recognition dictionary of backward tree-structure.

4. A speech recognition system according to claim 1, wherein the series of phonemes which is formed by hierarchically coupling a plurality of words indicates an address.

5. A speech recognition system according to claim 1, wherein the recognizing means has a function to identify a period for which the series of phonemes is inputted via the voice input means.

6. A speech recognition system according to claim 1, wherein the voice input means can input the plurality of words without intervals between two adjacent words.

7. A speech recognition system according to claim 1, wherein the dictionary means includes only a single recognition dictionary of backward tree-structure and the backward-tree structure has no self-loop, the number of branching points in the backward tree stricture being sequentially reduced depending on the voice input sequence, and the recognizing means outputs the result after only one execution of the backward recognition process.

* * * * *